United States Patent [19]
Zepponi

[11] 3,910,173
[45] Oct. 7, 1975

[54] WINE GRAPE PROCESSING APPARATUS

[75] Inventor: Gino R. Zepponi, Citrus Heights, Calif.

[73] Assignee: Winery Systems, Inc., Folsom, Calif.

[22] Filed: June 3, 1974

[21] Appl. No.: 475,396

[52] U.S. Cl. .............................. 99/277.1; 222/460
[51] Int. Cl.² ............................................ C12G 1/02
[58] Field of Search ....... 99/275, 277.1, 277.2, 278, 99/276, 277, 646 S; 222/460, 556, 462, 504; 426/15; 214/17 D; 195/127, 142, 139, 133

[56] References Cited
UNITED STATES PATENTS

| | | | |
|---|---|---|---|
| 2,721,006 | 10/1955 | Knutsen | 222/462 |
| 3,100,052 | 8/1963 | Brembeck | 214/17 D |
| 3,248,142 | 4/1966 | Schackerman | 222/556 |
| 3,729,321 | 4/1973 | Vacano | 99/277.1 |
| 3,811,372 | 5/1974 | Lenz | 99/277.1 |

*Primary Examiner*—Robert W. Jenkins
*Attorney, Agent, or Firm*—Lothrop & West

[57] ABSTRACT

A large cylindrical tank in vertical attitude is closed on the upper end by a dome having various fittings and on the lower end by an inverted conical bottom having a hinged door in the vicinity of the apex. The apex angle of the cone is predetermined so that when the axis of the cone is inclined to the axis of the tank with one element of the cone co-linear with an element of the tank, the opposite element of the cone is sloped at least as steeply as the angle of repose of the contents, thereby making the tank self-emptying. Interchangeable accessories, including a central foraminous core and inert gas connections, facilitate juice separation and enhance yield while the tank is operated as a pressure vessel. In situ fermentation of must (freshly crushed grapes and juice) and whole red grapes is also provided by installing a sprinkler head within the tank to keep the cap wet and broken. The self-emptying features readily enable the pomace (drained grape skins and pulp) to be transferred to a final pressing station, such as a Willmes Press, for further juice extraction. By varying the accessories and the procedures, several different alternative wine grape processes are made possible in a single installation. The equipment can also be used in the processing of vegetables, such as extracting juice from tomatoes.

11 Claims, 8 Drawing Figures

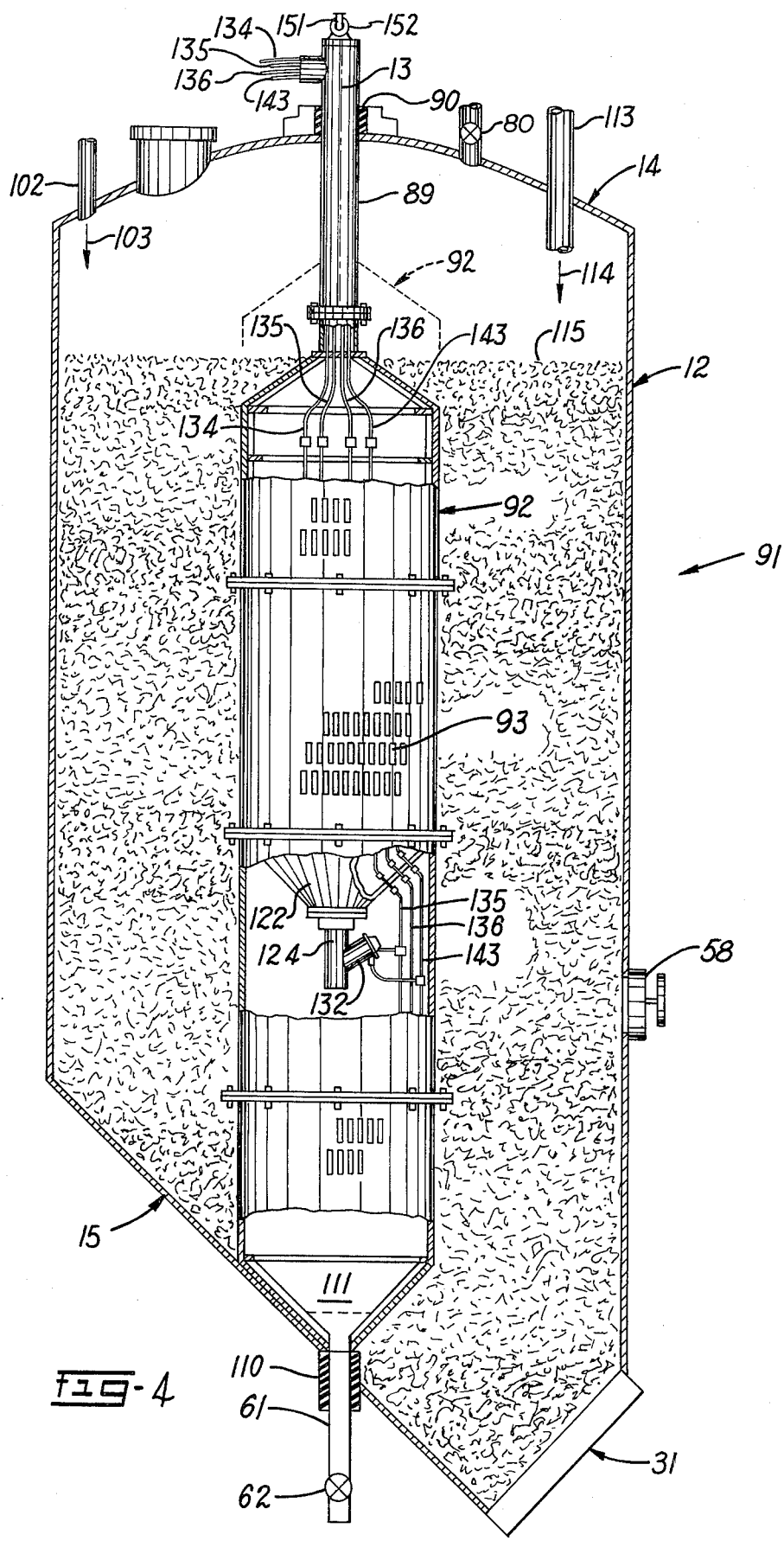

WINE GRAPE PROCESSING APPARATUS

The invention relates to a multiple use apparatus for processing wine grapes and the like.

Since winemaking is an art as old as recorded history, the marketplace is replete with equipment and systems for crushing grapes, separating the juice from the must and the pomace and fermenting the juice. Despite the rapid growth of technology in this field, however, and consequent advance in the state of the art, there remains much room for improvement.

It is therefore an object of the invention to provide a grape processing apparatus which affords a variety of beneficial results during the initial stages of winemaking, beginning with crushing and continuing through juice extraction, separation and fermentation.

It is another object of the invention to provide a grape processing apparatus which increases not only the yield but also the quality of the wine ultimately produced by minimizing the amount of suspended solids in the juice and by reducing skin contact time and oxidation.

It is still another object of the invention to provide an apparatus which is relatively economical both with respect to initial installation cost and upkeep expense.

It is yet another object of the invention to provide an apparatus including a tank which avoids bridging of the contents and is self-emptying.

It is a further object of the invention to provide an apparatus which requires less manual labor yet results in better sanitation, greater safety and reduced processing time.

It is yet a further object of the invention to provide an apparatus which is versatile in that it can be used not only in wine grape processing but can also be utilized in allied fields, such as in the production of tomato juice, citrus juice, fruit nectars, and the like.

It is an additional object of the invention to provide an apparatus which is capable of producing premium young varietal wines.

It is another object of the invention to provide a generally improved apparatus for the winemaking industry.

Other objects, together with the foregoing, are attained in the embodiments described in the following description in which.

Figure 3:
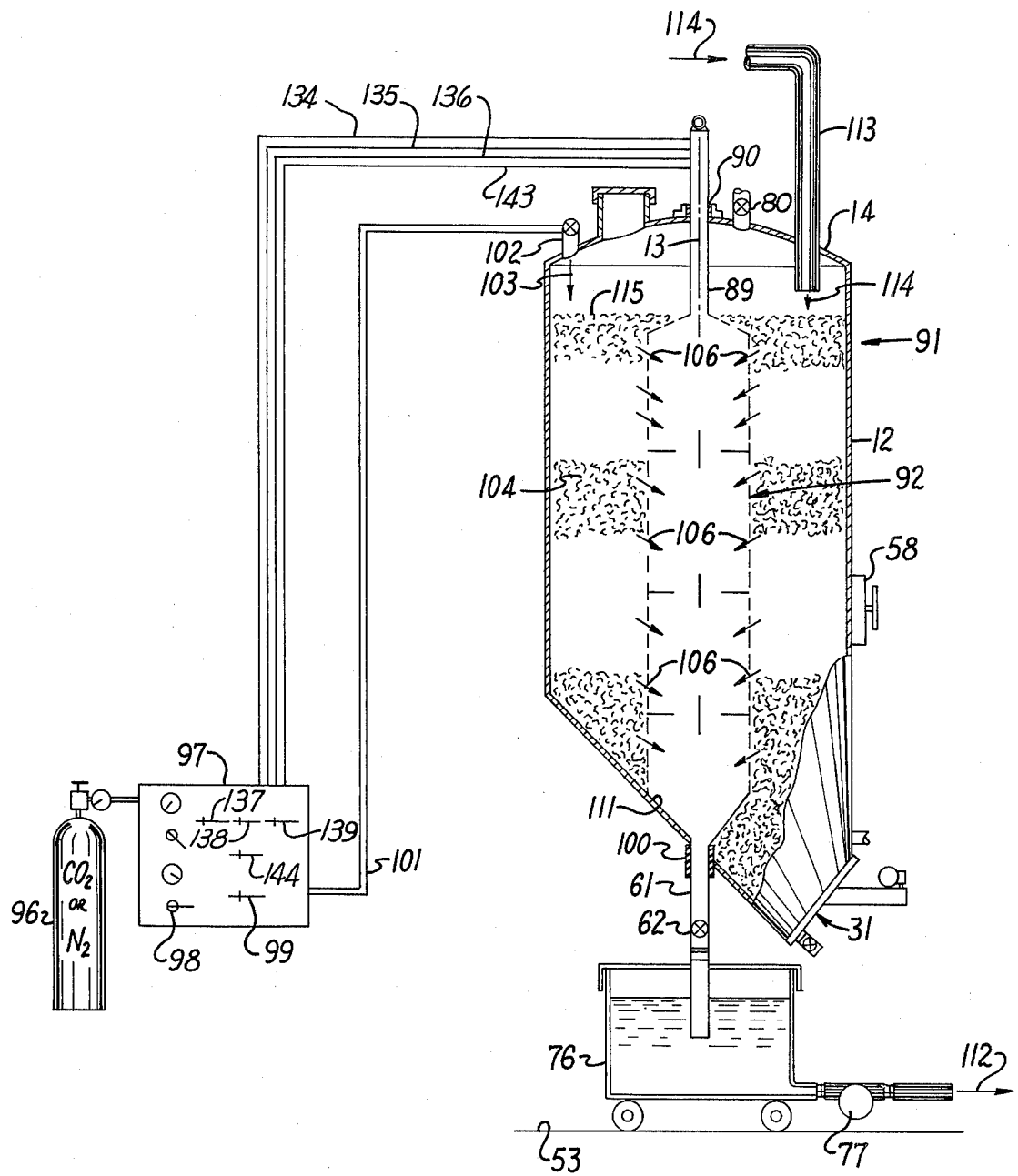
FIG. 3 is a schematic sectional view of a further variant form of apparatus, particularly for white grape juice separation.

FIG. 4 is a front elevational view, to an enlarged scale, of the juice separator installed in operating position in a self-emptying tank with portions shown in section, and with broken lines indicating the separator in elevated location; and, FIGS. 5A, 5B, 5C and 5D are schematic sectional views, showing, in a sequential fashion, the FIGS. 3 and 4 form of apparatus using a pressurized inert gas to facilitate juice separation.

While the processing apparatus of the invention is susceptible of numerous physical embodiments, depending upon the environment and requirements of use, several of the herein shown and described embodiments have been made, tested and used particularly in connection with wine grape processing.

The apparatus of the invention, generally designated by the reference numeral 11, preferably comprises a vertical, right circular-cylindrical tank 12, or container, having its axis 13 in vertical attitude. The container 12 is constructed of stainless steel material, in the interests of sanitation in dealing with food stuffs, such as grapes, tomatoes, or the like, and includes an upper closure, such as a dome 14, and a lower closure comprising an inverted conical member 15, the combination of the cylindrical container 12 and the conical bottom 15 being herein termed either a vessel 16, or a tank.

It is also to be recognized, although not shown in the drawings, that the container 12 can be of rectangular, or square, cross section, in which case the lower closure would be of inverted pyramidal configuration.

The arcuate dome 14 is mounted on top of the vertical side walls 17 of the cylindrical portion of the tank in customary fashion; and the imaginary or geometrical base 18 of the cone-shaped bottom 15 is inclined with respect to the cylindrical walls 17 at an angle such that the axis 19 of the cone 15 intersects the vertical axis 13 of the cylinder 12 at a predetermined angle "A" when one element 21 of the cone 15 is vertical and co-linear with a corresponding vertical element 22 of the superposed cylindrical side walls 17.

The lower rim 20 of the tank 12 is in actual practice secured to the circular margin formed by cutting the inclined cone 15 on the plane 24. The lower or apex portion 26 of the cone is thus oriented toward the right-hand side of the tank in FIG. 1, the right-hand side being treated as the front of the tank when installed.

Figure 1:
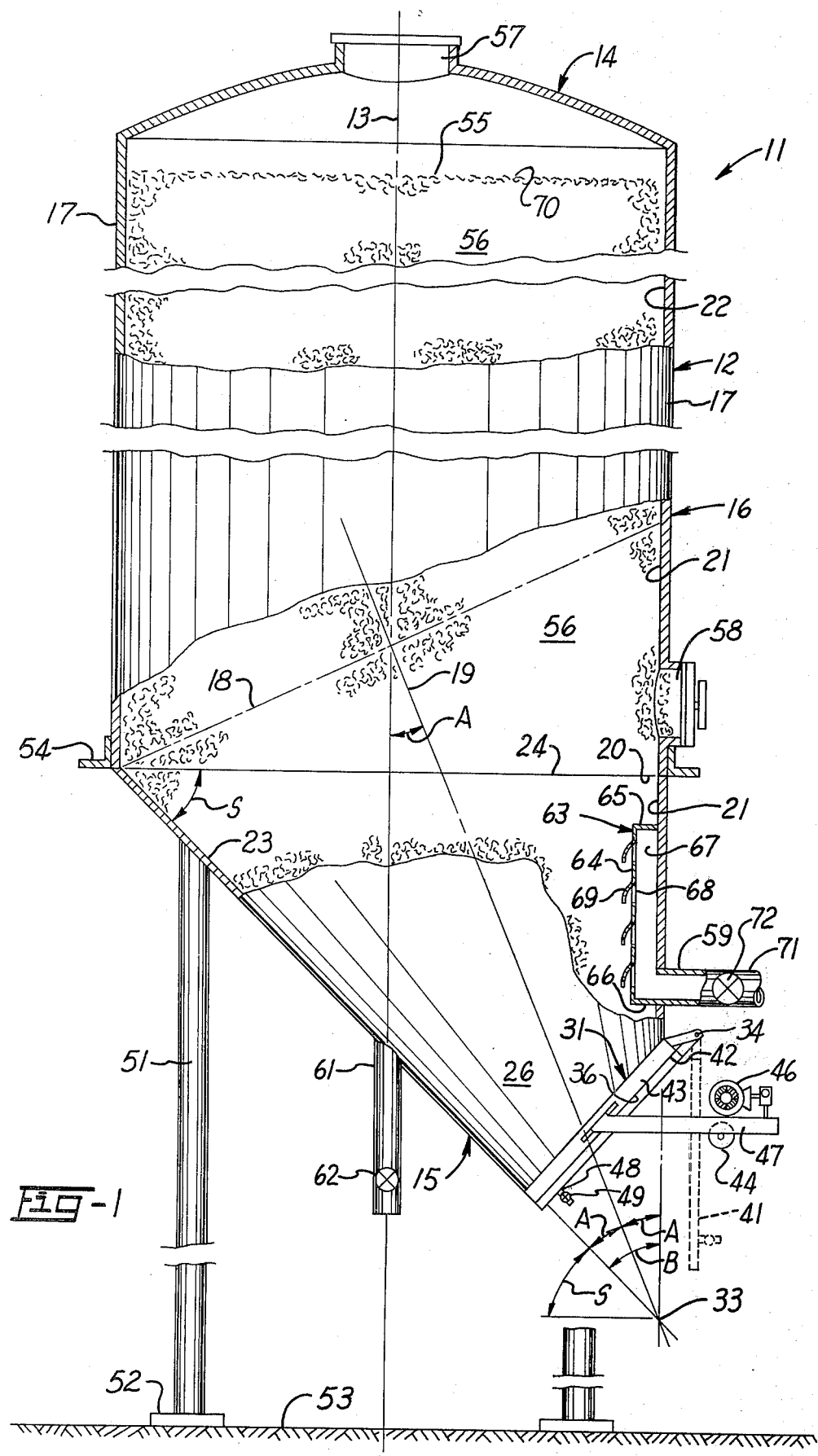
FIG. 1 is a front elevational view to an enlarged scale, of a typical self-emptying tank installation, portions being shown in section to reveal interior details.

The predetermined angle A is selected so that with the cone 15 located as shown most clearly in FIG. 1, the element 23 opposite the vertical element 21 of the cone is at a downward slope S which is at least as great as the angle of repose of the intended contents of the tank, and, more particularly the non-juice fraction of the contents from which the juice fraction has been separated.

In other words, as indicated by the construction lines in FIG. 1, the apex angle B of the cone 15 is twice the angle of intersection A between the cone's axis 19 and the hollow cylinder's axis 13; and the slope S of the least steep element 23 of the cone 15 is therefore 90° - B, i.e., the complement of apex angle B.

By establishing the element 23 at or greater than the angle of repose of the anticipated non-juice fraction of the contents, the tank becomes self-emptying when a discharge door 31, or gate, hingeably mounted on the lower, or apex, portion 26 of the conical bottom 15 is opened.

As can be seen most clearly in FIG. 1, the door 31 is removed somewhat from the geometrical apex 33 of the inverted cone 15 and is hinged on an elevated pivot 34 so that when the door is opened, the bottom of the door swings outwardly and upwardly to the position indicated in broken lines in FIG. 1, thereby allowing the contents, such as pomace (drained grape skins and pulp), to slide out the discharge port 36. Raking, scooping, shoveling or sluicing as has previously been required is thereby obviated.

The door 31 comprises a circular plate 41 movable into tight overlying position against the annular lip 42 of a discharge neck 43, closing and opening being afforded by alternative means including a hand-wheel 44 and an electric motor 46. Other suitable door-biasing structures, hydraulically or pneumatically actuated, can also be used. A frame 47 mounted on the discharge neck 43 of the conical member 15 affords a fixed base for the door actuating mechanism.

The extent of door opening can be carefully controlled so that the quantity of material emptying from the tank is metered. Thus, the outflow of pomace can be matched to the capacity of the system used to transport pomace to the press used to remove any residual juice from the pomace.

Where desired, an opening 48 with a valve 49 can be provided in the circular plate 41 in order to withdraw either samples of the contents or fractions of the contents, such as juice which has accumulated near the gate 31.

For convenience, the initial contents, or charge, will hereafter be deemed to be what is known in the wine industry as must, which, as previously indicated, is freshly crushed grapes and the attendant juice.

The entire apparatus is supported by a plurality of columns 51 with footings 52 located on a concrete pad 53. Supported on the upper ends of the columns is an annular shoulder 54 provided by angle iron suitably mounted on the tank girth at a location adjacent the upper end of the cone element 23.

In the installation shown in FIG. 1, the tank 16 is filled to the level 55 with must 56 previously introduced through an inlet opening 57 in the top of the dome 14. Where required, other appropriate openings can be located on the vessel, such as a manhole 58, for inspection and cleaning, a horizontal fluid draim 59 and a vertical fluid drain 61 with valve 62. Upon completing the processing of the must 56, including separation of the juice, all of the drained grape skins and pulp, called pomace, can be removed merely by opening the discharge door 31. Since the slope of the element 23 is such that the pomace will slide toward the door 31, and since the slope of element 23 is at the least angle from the vertical of any of the vessel's interior walls, it follows that all of the pomace will positively move toward and out the door.

Furthermore, by inclining the axis 13 of the cone relative to the vertical axis 19 of the tank in the manner disclosed, the symmetrical downwardly and inwardly converging force vectors which lead to "bridging" in the customary vertical type of funnel bottom are avoided. Instead, the gravity vectors are rendered asymmetrical, both as to direction and extent, as a result of which bridging is obviated. The tank, in other words, is reliably self-emptying and thus accelerates the usual slow and tedious procedure requiring workmen to insert scoops, rakes, and the like, through the discharge opening 31 in order to collapse bridged material and physically to withdraw the contents.

In the tank illustrated most clearly in FIG. 1, juice which has separated from the must 56 descends toward the bottom front of the tank, the front of the tank being the side toward which the door 31 is oriented, as previously indicated.

Figure 2:
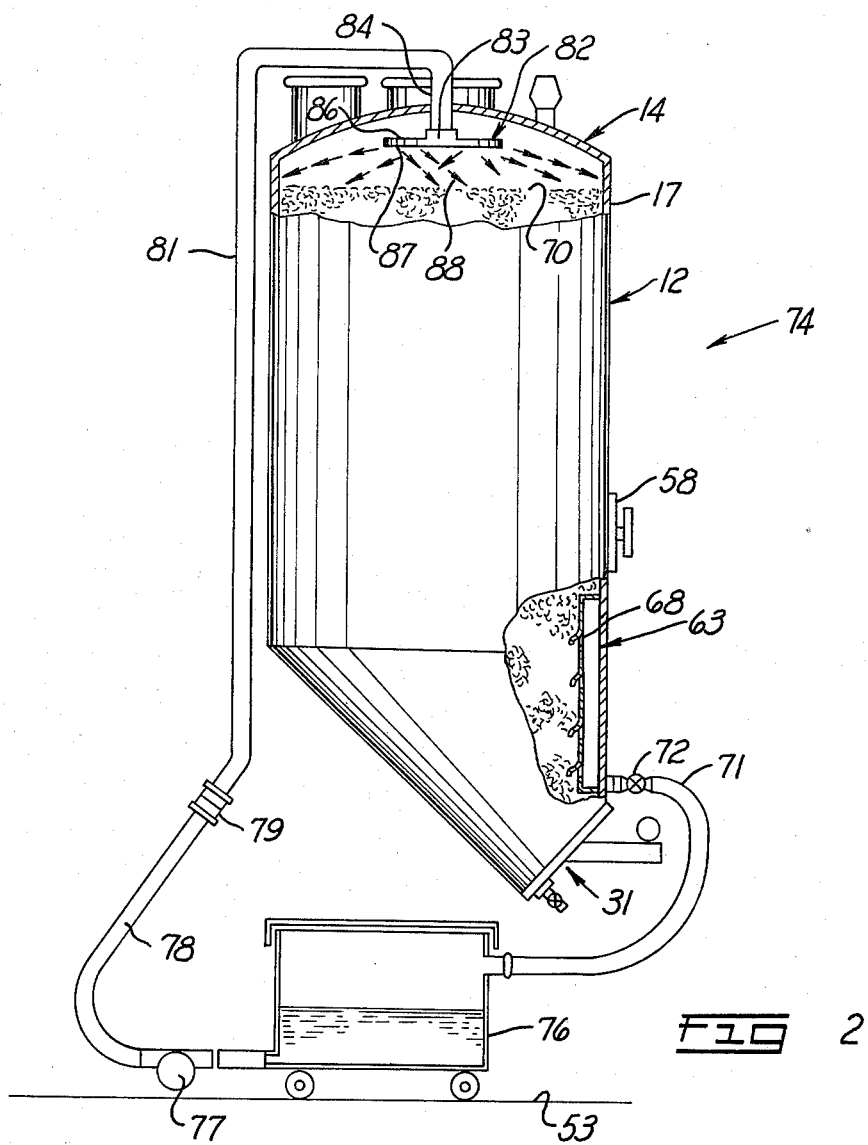
FIG. 2 is a schematic sectional view of a variant form of apparatus, particularly for red grape fermentation.

Located just above the door 31 and centered on the front vertical element 21 of the tank is a juice receptable 63 as schematically shown in FIGS. 1 and 2. The receptacle 63 comprises an inner wall 64 with a top 65, bottom 66 and opposite side walls 67. The inner wall 64 is provided with a plurality of louvered openings 68 preferably shielded by inwardly projecting hoods 69.

Fluid migrating from the must 56 enters the collecting receptacle 63 through the louvers 68 and descends to the bottom of the receptacle where it emerges through the outlet port 59 and enters a conduit 71, flow being controlled by a valve 72.

The louvered screen structure 63 allows draining of clean wine without clogging, thus facilitating the use of a fixed plumbing system to pump wine over the pomace cap 70 which tends to form on top as shown in FIGS. 1 and 2.

A modified form of the tank installation shown in FIG. 1 is especially utilized in connection with the fermentation of red grapes as will now be described.

The red grape fermenter, generally designated by the reference numeral 74, is most clearly illustrated in FIG. 2; and, in addition to the structure previously described in FIG. 1, includes a portable sump 76 located on the pad 53. The sump 76 is connected to the conduit 71 so as to receive and temporarily store the fluid which flows out of the louver screen 63.

From the sump 76, the fluid can be transferred by a motor driven pump 77 through a flexible hose 78 attached by a connector 79 to a pipe 81 extending upwardly, over and down, as shown, to a fluid distributing head 82 inside the tank.

The sprinkler head 82 conveniently comprises a hub 83 rotatably mounted on the bottom of the adjacent short vertical portion 84 of the pipe 81; and projecting radially in opposite directions from the hub 83 is a pair of tubes 86 formed with slanted nozzles 87 arranged so that as juice emerges from the nozzles, the sprinkler 82 rotates by reactive effort.

As the sprinkler 82 rotates, fluid is sprinkled over the floating pomace cap 70 which tends to form on the exposed top surface of the contents, as indicated above. The fluid jets, as indicated by the small arrows 88, strike the pomace cap 70 and not only keep it moist but tend to break up the cap.

EXAMPLE 1

Red Grape Fermentation

The installation disclosed in FIG. 2 and described above was initially used to ferment nineteen tons of Cabernet Sauvignon grape. The must was fermented on the skins for twelve days, the cap being kept wet and broken by periodically pumping over through a pipe from the pad to the spinning head rotatably mounted inside the tank.

After fermentation was complete, the free run of fluid was drained out through the louvered receptacle adjacent the discharge door of the tank. After draining, the discharge door was electrically operated in order to empty the pomace from the tank at a controlled rate, the pomace being then transferred to a hopper, thence pumped from the hopper to a conventional press, such as a Willmes Press, or the like, for further fluid extraction.

During the remainder of the season, Napa Gamay and Zinfandel grapes were similarly processed.

No manual handling or sluicing of the pomace was required and no workers had to enter the tank.

Pump over was accomplished at ground level, thus eliminating the need to drag hoses to the top of the tank.

In summary, operation was smoother, sanitation was improved, worker safety was enhanced, processing time was reduced and much manual labor was eliminated through the use of the disclosed self-emptying fermentation system.

FIGS. 3, 4 and 5A – 5D illustrate yet another application of the self-emptying tank concept, which is of particular benefit in connection with the separation of white grape juice; and is generally designated by the reference numeral 91.

As before, the tank 12 includes the vertical cylindrical portion, the inverted conical bottom closure and the front facing gate 31 for the self-emptying discharge of pomace at the appropriate time and at a controlled rate for transfer to a press for further extraction of fluid.

In the FIGS. 3, 4 and 5A – 5D form of apparatus, however, a right circular cylindrical core 92 constructed of foraminous, stainless steel material is located coaxially on the vertical axis 13 of the tank 12. The core 92 is supported for the most part by a pipe 89 extending through the dome 14 with sealing members 90.

The openings in the screen material are small enough to allow the passage of fluid into the core interior but not of solids or semi-solids which are larger in a maximum dimension than 0.167 inch.

A typical screen pattern is shown to a reduced scale in FIG. 4 and designated by the numeral 93. In practice, the width of each opening can be on the order of 0.167 inch, the length 0.750, and the distance between centers, 0.125 inch.

In the white grape juice separating system 91, the tank 12 is operated as a pressure vessel, an inert gas, such as carbon dioxide, or nitrogen, being introduced into the tank under greater than atmospheric pressure (e.g., 25 psi gauge) during processing.

The customary gas bottle 96 is connected to suitable conventional fittings, not shown, on the back side of a control panel 97 located adjacent the tank. The gas from the bottle 96 passes through a pressure regulator 98 thence through a control valve 99 and into tubing 101 leading to a fitting 102 on the dome 14. The pressurized gas then flows into the inside of the tank in the direction of the arrow 103. The gas, in other words, imposes a downward pressure on top of the body of must 104, permeating downwardly through the must and expressing juice from the must into the core 92 in the direction indicated by the arrows 106. A pressure relief valve 80 is set at an appropriately safe amount.

The juice, in other words, passes through the screen openings in the core 92 and descends through the core to an inverted conical collector 111 at the bottom of the core, from which location the juice empties into the drain pipe 61, thence through the valve 62 into the portable sump 76, being transferred from the sump 76 by the motor driven pump 77 in the direction of the arrow 112 as desired.

A lower seal 110 below the collector 111 cooperates with the upper seal 90 to sustain pressurized conditions, yet allows upward translation of the core 92 at the conclusion of the operation as will be described.

Filling of the annular chamber between the walls of the core 92 and the tank 12 is accomplished by pumping crushed and stemmed grapes (white must) directly into the filler pipe 113, and from the pipe to the tank, as indicated by the arrow 114. During filling, the must is continuously dejuiced through the perforated stainless steel core 92.

When crushing is completed and the tank is filled to the level 115, the system is sealed and pressured with the $CO_2$ (or $N_2$) in order to extract further juice.

This pressurized juice extraction is accomplished by the use of a gas control system in the core 92, as will now be described and as most clearly appears in FIGS. 3, 4 and 5A – 5D.

Within the core 92 is a plurality of diaphragms 121, 122 and 123, or partitions, vertically spaced apart, with drain pipes 124 located at the center of the partitions. Mounted on the drain pipes 124 are respective valves 131, 132 and 133 which, as represented diagramatically in FIGS. 5A, 5B, 5C and 5D, can be selectively moved between open and closed position from the control panel 97.

Preferably, the diaphragm valves 131, 132 and 133 are air-actuated, as appears most clearly in FIGS. 3 and 4, with three pressurized air lines 134, 135 and 136 leading from the control panel 97 to the respective diaphragm valves via the pipe 89 connected to the top of the central core 92 (see FIG. 4).

Three control valves 137, 138 and 139 on the control panel 97 enable the operator to open and close the respective air valves 131, 132 and 133 at the appropriate juncture as the interface 140 between the pomace 141 and the must travels downwardly, as appears in FIGS. 5A through 5D under the influence of the superimposed pressure of the inert gas, such as $CO_2$ or $N_2$, previously introduced into the tank through the pressure line 101.

Each of the air valves 131, 132 and 133 is connected to a common line 143 capable of serving either as a vent or as a counter-pressure line when the valve is to be switched from closed position to open position. A valve 144 on the panel 97 controls the vent/counter-pressure line 143.

Figure 5A:
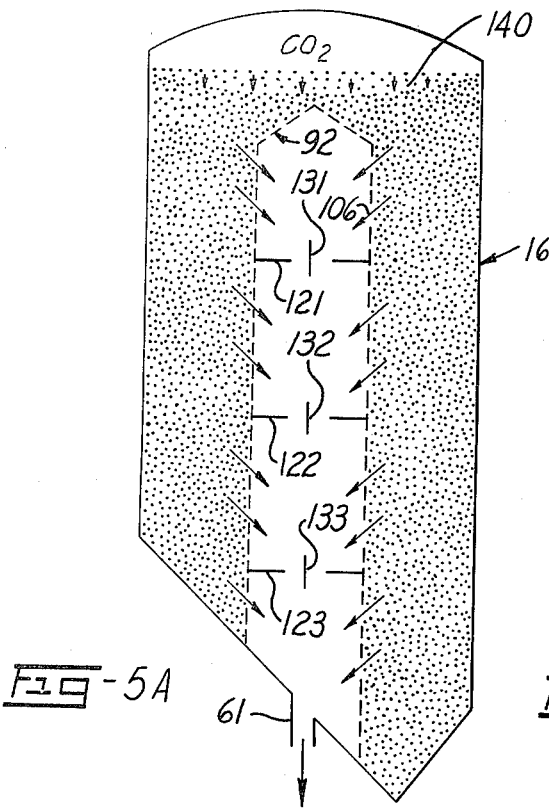

The sequence of diaphragm valve operation is now described, with particular refernce to FIGS. 5A–5D. Initially, when the pomace-must interface is spaced above the top of the core 92, as shown in FIG. 5A, all three of the diaphragm valves 131, 132 and 133 are open. In this condition, the juice 106 flows through the core screen from the top to the bottom of the core, and out through the drain 61.

Figure 5B:
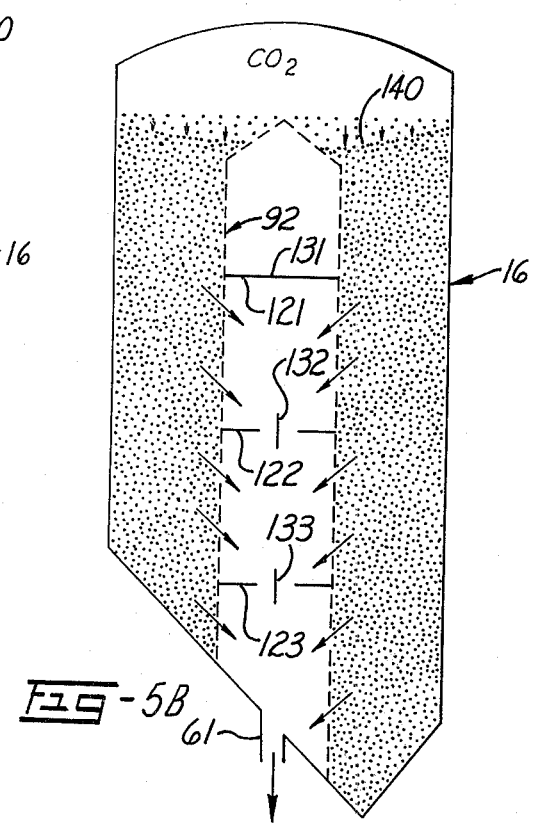

When, however, the interface 140 reaches the top of the hollow, foraminous core, as appears in FIG. 5B, the topmost valve 131 is closed so that the pressured $CO_2$ does not escape down the core and out the drain 61. When the valve 131 is closed, the pressure in the top portion of the core above the top diaphragm 121, prevents further juice inflow into the top portion. The juice is expressed downwardly, instead.

Figure 5C:
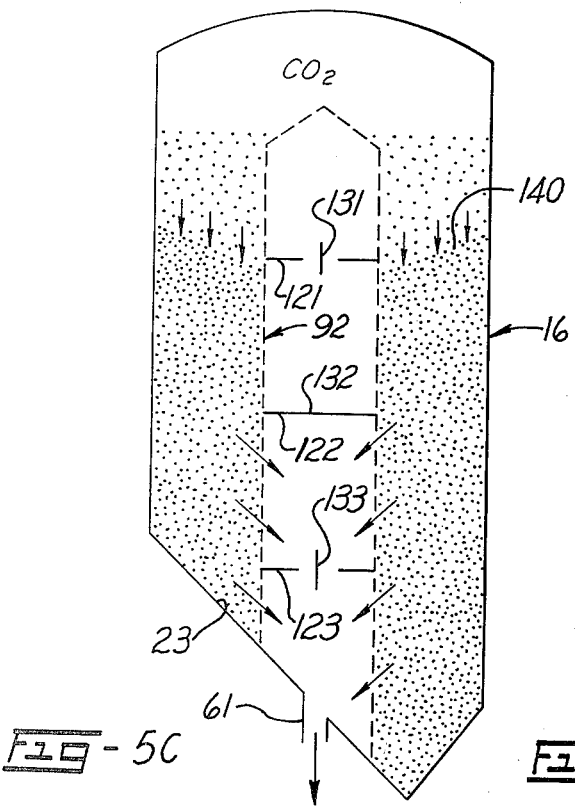
Figure 5D:
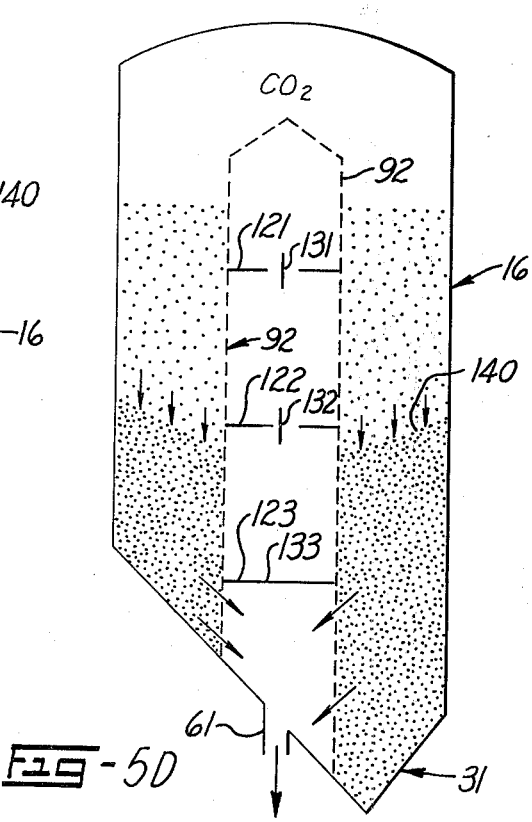

Next, as the interface 140 reaches the level shown in FIG. 5C, the middle valve 132 is closed and the upper valve 131 is opened. Juice continues to flow into the bottom half of the core.

Then, as the interface 40 descends past the diaphragm 122, the bottom valve 133 is closed and the middle valve 132 is opened.

By the time the interface moves downwardly past the bottom partition 123, the major bulk of the juice contained in the must has been separated and drained into the portable sump 76. Any remaining juice in the must and the pomace above is recovered by emptying the tank and transferring the contents to a press. Emptying of the tank is effected by first elevating the core 92 to a sufficient distance so that the pomace can flow down across the bottom 23 of the tank and out the door 31.

Lifting of the core 92 is accomplished by attaching a crane hook 151, for example, to an eye 152 on the upper end of the pipe 89. The upper seal 90 and lower seal 110 permit of translational movement of the pipe 89 and drain 61, respectively, as lifting of the core takes place to the location indicated in broken line in FIG. 4. The two seals, however, effectively prevent the unwanted escape of pressured $CO_2$ as the core is returned to its base position, the tank is reloaded and the dejuicing cycle is again started. The lines 134, 135 and 136 in the vicinity of the pipe eye 152 are sufficiently flexible as not to interfere with or in any way be damaged by elevating the core 92 in the manner just described.

A cake of pomace builds up on the outside of the core as juice separation occurs, the cake serving beneficially as a filter which removes suspended solids. As a further advantage, additional suspended solids are not generated owing to the fact that there is no maceration of the grapes such as occurs with a conventional juice separating screen.

A high percentage of free run is obtained with a minimum of skin contact time and oxidation, oxidation of the free run being prevented by the inert gas atmosphere in the tank. In addition, the press juice is partially protected from oxidation by the residual inert gas in the pomace transferred to the press and permeated by the gas.

EXAMPLE 2

White Grape Juice Separating System

The above described system was initially used to process 14.6 tons of Chenin Blanc grape. This grape was crushed, stemmed and pumped directly into the tank. During the filling, the must was continuously dejuiced through a perforated stainless steel core. When the crushing was completed, the system was sealed and pressurized with $CO_2$ in order further to extract juice, a sequential gas control system in the core being used for most advantageous results.

Total juice extracted was 1,721 gallons for a free run yield of 118 gallons for each ton. Juice extraction time was 175 minutes.

Evaluation of samples indicated that very clear juice was obtained. No exposure to the air was required during the dejuicing process and the $CO_2$ saturated pomace was less subject to oxidation during pressing.

After dejuicing was completed, the discharge door was electrically operated to empty and control the flow of pomace into a hopper and then pumped to a Model 1500 Willmes Press where 557 gallons of additional juice was extracted.

Total yield was 156 gallons per ton, of which 76% was free run.

No handling of pomace was required.

With the use of the juice separator system, four press loads were required to process the 14.6 tons of grapes. Previously, seven press loads were required for a similar quantity of grapes, without the use of the juice separator.

Subsequently, the system was used to comparable advantage with Traminer and Chardonnay grape. The tank is 6.5 feet in diameter and 22 feet high; and the system can process up to 40 tons of grapes in 8 hours.

Later, the core was removed and the apparatus was used as a self-emptying red grape fermenter.

Referring again to the FIG. 2 form of apparatus, the self-emptying red grape fermentation system heretofore described in detail, and set forth in Example 1, can be converted to a whole grape fermenter using a variant form of maceration conveniently designated "quasi carbonic maceration."

Again, the sprinkler head 82 and the portable sump 76 are used, together with the associated juice recirculating equipment, as disclosed.

EXAMPLE 3

Whole Red Grape Fermentation System

The tank was filled with 17 tons of Napa Gamay grape and sealed. During the filling, 500 gallons of clean juice, which leached from the whole grape, was drained through the louver screens into the receptacle and collected in the portable sump. This juice was treated with a sterilant, such as $SO_2$, to prevent the growth of wild (i.e., undesirable) yeasts and pumped to the sprinkler head for distribution over the tank contents.

After 2 hours, the juice was again collected and inoculated with cultured yeast. The yeast-inoculated juice was then sprinkled over the grape to start a fermentation on the grape skin surfaces.

Throughout the process, the juice accumulating at the bottom of the tank was periodically drained and pumped over the grape.

When sufficient color was extracted from the skins, the discharge door was electrically opened, allowing the contents to flow out of the tank, in a metered amount, and collect in a hopper. From the hopper, the grape was pumped to a press where additional juice was squeezed out. The pumping process was used to crush the grape in the transfer from hopper to press.

After the grape was pressed, the resulting juice was treated as a white wine.

This system enables the production of premium young varietal wines. Bacteria and yeast control, the reduction of color extraction time, and ease of grape removal from the tank makes it reasonable and economically sound.

What is claimed is:

1. A juice processing apparatus comprising:
   a. a tank having vertical side walls encompassing the material to be processed, the material including a juice fraction and a non-juice fraction;
   b. a downwardly converging bottom closure mounted on the lower end of said tank with one element of said bottom closure substantially vertical and colinear with a vertical element of said tank, the opposite element of said bottom closure being inclined at least at the respose angle of the non-juice fraction to enable the same to slide toward the lower convergent portion of said bottom closure, said lower convergent portion having an opening therein;
   c. a door hingeably mounted on said bottom closure to cover and uncover said opening, at least the non-juice fraction being dischargeable through said opening by gravity alone as said door uncovers said opening;
   d. Means connected to said bottom closure for draining the juice fraction separated from the non-juice fraction and accumulated in said bottom closure;
   e. means mounted on said tank adjacent the upper end thereof for sprinkling the contents; and,
   f. means associated with said draining means and leading to said sprinkling means for reintroducing the juice fraction accumulated in said bottom closure into said upper end of said tank.

2. A juice processing apparatus as in claim 1 in which said tank is right circular cylindrical and said bottom closure is at least in part conical.

3. A juice processing apparatus as in claim 2 including a right-circular cylindrical perforated core mounted coaxially within said tank and forming a juice conduit, the diameter of said core being less than the diameter of said tank to define an annular chamber for the reception of must (freshly crushed grapes and juice), the perforations of said core being of a dimension such as to allow the passage of juice from said annular chamber into said core and bar the movement of must and pomace (drained grape skins and pulp) into said core.

4. A juice processing apparatus as in claim 3 including means communicating with said core for removing the juice accumulated therein.

5. A juice processing apparatus as in claim 4 in which said tank is a pressure vessel, and in which said apparatus includes means for introducing gas under greater than atmospheric pressure into said upper end of said tank to express juice into said core.

6. A juice processing apparatus as in claim 5 in which said core includes a plurality of transverse partitions; a valve mounted on each of said partitions for controlling the flow of gas therethrough; and means for selectively controlling the movement of said valves between open and closed position to regulate the flow of gas through said partitions as the interface between the pomace and the must moves downwardly through said tank and said core.

7. A juice processing apparatus as in claim 3 including means for selectively elevating said perforated core above said opposite element of said bottom closure to facilitate the flow of said non-juice fraction through said opening as said door uncovers said opening.

8. A juice processing apparatus as in claim 1 in which said sprinkling means is a head rotatably mounted on the upper end of said tank, said head including a plurality of fluid discharge nozzles.

9. A juice processing apparatus comprising:
  a. a vessel having side walls, an upper end closure and a lower end closure, said vessel encompassing the material to be processed, the material including a juice fraction and a non-juice fraction;
  b. a perforated core mounted within said vessel encompassed by the material to be processed, the perforations of said core being of a dimension such as to allow the passage of the juice fraction into said core and bar the movement of the non-juice fraction into said core;
  c. means for introducing gas under greater than atmospheric pressure into the upper end of said vessel to express the juice fraction of the material into said core;
  d. means communicating with said core for draining the juice expressed into said core; and,
  e. means adjacent the bottom of said lower end closure for removing from said vessel the non-juice fraction of the material remaining after separation of the juice fraction.

10. A juice processing apparatus as in claim 9 in which said core includes a plurality of transverse vertically spaced partitions; a valve mounted on each of said partitions for controlling the flow of gas therethrough; and means for selectively controlling the movement of said valves between open and closed position to regulate the flow of gas through said partitions as the interface between the material and the non-juice fraction of the material moves progressively downwardly as the juice is separated from the material and expressed into said core.

11. A juice processing apparatus as in claim 10 in which the least slope of any portion of said lower end closure is not less than the repose angle of the non-juice fraction to enable the same to slide toward the bottom of said lower end closure by gravity alone.

* * * * *